United States Patent
Kraft et al.

(10) Patent No.: US 9,201,427 B2
(45) Date of Patent: Dec. 1, 2015

(54) METHOD AND DEVICE FOR CONTROLLING A VALVE

(75) Inventors: Thomas Kraft, Obertraubling (DE); Hans Riepl, Hemau (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 96 days.

(21) Appl. No.: 14/115,413

(22) PCT Filed: May 3, 2012

(86) PCT No.: PCT/EP2012/058105
§ 371 (c)(1),
(2), (4) Date: Nov. 4, 2013

(87) PCT Pub. No.: WO2012/150294
PCT Pub. Date: Nov. 8, 2012

(65) Prior Publication Data
US 2014/0070124 A1 Mar. 13, 2014

(30) Foreign Application Priority Data
May 4, 2011 (DE) .......................... 10 2011 075 269

(51) Int. Cl.
*F02D 41/20* (2006.01)
*G05D 7/06* (2006.01)
(Continued)

(52) U.S. Cl.
CPC .............. *G05D 7/0629* (2013.01); *F02D 41/20* (2013.01); *F02D 41/2464* (2013.01); *F16K 31/0658* (2013.01); *F02D 2041/2037* (2013.01)

(58) Field of Classification Search
CPC .......................... F02D 41/20; F02D 2041/2037

USPC ................................................... 123/479, 490
See application file for complete search history.

(56) References Cited

U.S. PATENT DOCUMENTS

| 4,823,825 | A | * | 4/1989 | Buchl ............................... 137/1 |
| 5,182,517 | A | | 1/1993 | Thelen et al. .................. 324/418 |
| 6,019,441 | A | | 2/2000 | Lloyd et al. ................... 303/156 |

(Continued)

FOREIGN PATENT DOCUMENTS

| DE | 3942836 A1 | 6/1991 | ................ F02D 1/20 |
| DE | 4110254 A1 | 10/1992 | ................ B60T 8/36 |

(Continued)

OTHER PUBLICATIONS

International Search Report and Written Opinion, Application No. PCT/EP2012/058105, 10 pages, Dec. 11, 2012.

*Primary Examiner* — Erick Solis
(74) *Attorney, Agent, or Firm* — Slayden, Grubert Beard PLLC

(57) ABSTRACT

A method is provided for controlling a valve having a spring, a pin, and an actuator for actuating the pin. A current having a specified current profile is applied to the actuator, starting from an initial current value at which the pin is in an initial position in which the pin allows the valve to move between open and closed positions. The current profile includes a section or several consecutive sections, wherein each section defines an initial current value and a final current value, a first time interval having a continuously falling current, and a subsequent second time interval having a continuously rising current. For each section, the final current value is less than the initial current value. After the specified current profile has been passed through, the pin is in a final position in which the pin prevents the valve from moving between open and closed positions.

17 Claims, 3 Drawing Sheets

(51) Int. Cl.
*F02D 41/24* (2006.01)
*F16K 31/06* (2006.01)

(56) References Cited

U.S. PATENT DOCUMENTS

| | | | |
|---|---|---|---|
| 6,128,175 A * | 10/2000 | Wright et al. | 361/154 |
| 6,285,151 B1 * | 9/2001 | Wright et al. | 318/560 |
| 6,373,678 B1 * | 4/2002 | Bartsch et al. | 361/160 |
| 6,483,689 B1 * | 11/2002 | Koch et al. | 361/160 |
| 6,546,903 B2 * | 4/2003 | Taniguchi et al. | 123/90.11 |
| 6,741,441 B2 * | 5/2004 | Hilbert et al. | 361/160 |
| 7,054,128 B2 * | 5/2006 | Fuwa | 361/152 |
| 7,853,360 B2 | 12/2010 | Kissler Fernandez et al. | 700/275 |
| 8,038,122 B2 * | 10/2011 | Gelez et al. | 251/129.04 |
| 8,239,115 B2 * | 8/2012 | Ascher et al. | 701/103 |
| 8,402,952 B2 | 3/2013 | Haaf et al. | 123/499 |
| 2012/0118271 A1 * | 5/2012 | Borg et al. | 123/495 |
| 2013/0134335 A1 | 5/2013 | Wirkowski et al. | 251/129.01 |

FOREIGN PATENT DOCUMENTS

| | | | | |
|---|---|---|---|---|
| DE | 10148219 A1 | 4/2003 | | F02D 41/20 |
| DE | 69811592 T2 | 10/2003 | | B60T 8/36 |
| DE | 102004048706 A1 | 4/2006 | | H01F 7/18 |
| DE | 102007035316 A1 | 1/2009 | | F02D 41/20 |
| DE | 102010022536 A1 | 12/2011 | | F02M 59/46 |
| WO | 2012/150294 A2 | 11/2012 | | F02D 41/20 |

\* cited by examiner

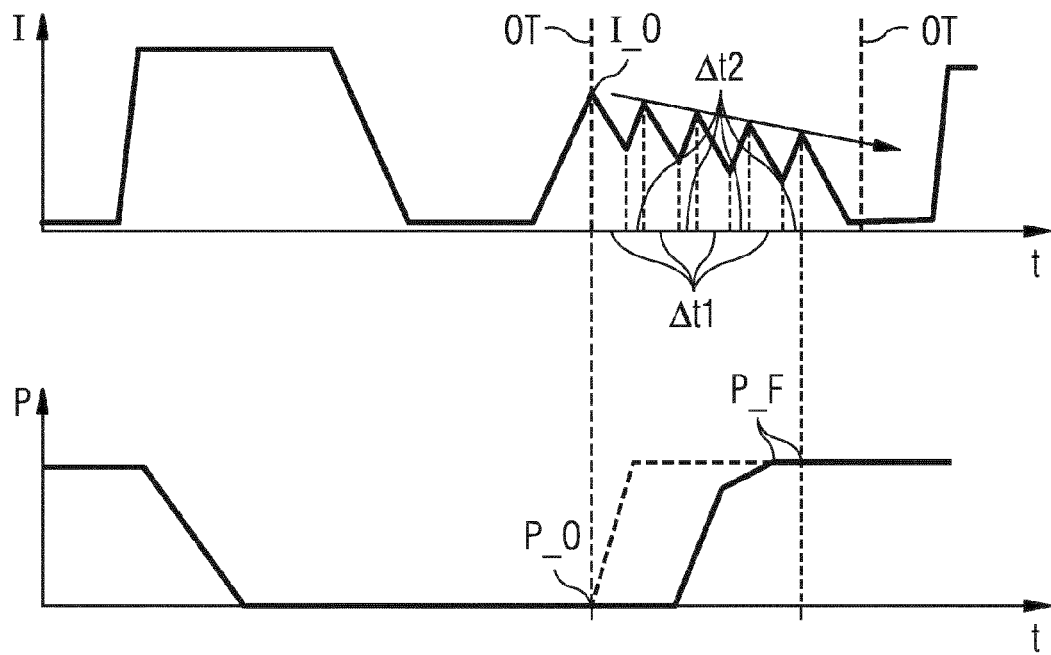

METHOD AND DEVICE FOR CONTROLLING A VALVE

CROSS-REFERENCE TO RELATED APPLICATIONS

This application is a U.S. National Stage Application of International Application No. PCT/EP2012/058105 filed May 3, 2012, which designates the United States of America, and claims priority to DE Application No. 10 2011 075 269.2 filed May 4, 2011, the contents of which are hereby incorporated by reference in their entirety.

TECHNICAL FIELD

The invention relates to a method and a device for controlling a valve, e.g., a valve used in a high-pressure pump in an accumulator-type injection system of an internal combustion engine.

BACKGROUND

Certain internal combustion engines include an accumulator-type injection system having a high-pressure pump for delivering fluid. Such valves are subjected to intense stresses, in particular if they are subjected to continuous loading such as is the case for example in high-pressure pumps. Since high-pressure pumps are subjected to pressures of for example 2000 bar and greater, high demands are placed on the valves in pumps of said type. Noises can occur both during the closing and during the opening of said valves.

SUMMARY

One embodiment provides a method for controlling a valve which has a spring with a spring force, an actuator with an actuator force that counteracts the spring force, and a pin which is coupled to the spring and which can be actuated by means of the actuator, in which method the actuator has a current applied to it with a predefined profile proceeding from a starting value of the current, at which the pin is in a starting position in which the pin, in the case of a valve which is open in a de-energized state, permits the closure of the valve, and in the case of a valve which is closed in a de-energized state, permits the opening of the valve, wherein the profile of the current is predefined so as to have one section or multiple temporally consecutive sections, wherein each of the sections has in each case a starting value of the current, a final value of the current, a first time interval with a continuously falling current profile and a temporally subsequent second time interval with a continuously rising current profile, and the sections are configured such that, after the respective section is passed through, the final value of the current is lower than the starting value of the current, and after the predefined profile of the current is passed through, the pin is in an end position in which, in the case of a valve which is open in a de-energized state, said pin does not permit the closure of the valve, and in the case of a valve which is closed in a de-energized state, said pin does not permit the opening of the valve.

In a further embodiment, the profile of the current in the temporally consecutive sections is of V-shaped configuration.

In a further embodiment, the valve is arranged in an injection system of an internal combustion engine, and the profile of the current is determined as a function of characteristic values of the internal combustion engine.

Another embodiment provides a device for controlling a valve which has a spring with a spring force, an actuator with an actuator force that counteracts the spring force, and a pin which is coupled to the spring and which can be actuated by means of the actuator, wherein the device is designed such that the actuator has a current applied to it with a predefined profile proceeding from a starting value of the current, at which the pin is in a starting position in which the pin, in the case of a valve which is open in a de-energized state, permits the closure of the valve, and in the case of a valve which is closed in a de-energized state, permits the opening of the valve, wherein the profile of the current is predefined so as to have one section or multiple temporally consecutive sections, wherein each of the sections has in each case a starting value of the current, a final value of the current, a first time interval with a continuously falling current profile and a temporally subsequent second time interval with a continuously rising current profile, and the sections are configured such that, after the respective section is passed through, the final value of the current is lower than the starting value of the current, and after the predefined profile of the current is passed through, the pin is in an end position in which, in the case of a valve which is open in a de-energized state, said pin does not permit the closure of the valve, and in the case of a valve which is closed in a de-energized state, said pin does not permit the opening of the valve.

BRIEF DESCRIPTION OF THE DRAWINGS

Example embodiments of the invention are explained below with reference to the drawings, in which:

FIG. 3 shows a schematic view of a current profile and of a profile of the position of the valve pin with respect to time.

DETAILED DESCRIPTION

Embodiment of the present invention provide a method and a device for controlling a valve, which method and device permit precise and inexpensive operation of the valve.

Some embodiments provide a method and a corresponding device for controlling a valve. The valve has a spring with a spring force, an actuator with an actuator force that counteracts the spring force, and a pin which is coupled to the spring and which can be actuated by means of the actuator. The actuator has a current applied to it with a predefined profile proceeding from a starting value of the current, at which the pin is in a starting position in which the pin, in the case of a valve which is open in a de-energized state, permits the closure of the valve, and in the case of a valve which is closed in a de-energized state, permits the opening of the valve. The profile of the current is predefined so as to have one section or multiple temporally consecutive sections, wherein each of the sections has in each case a starting value of the current, a final value of the current, a first time interval with a continuously falling current profile and a temporally subsequent second time interval with a continuously rising current profile, and the sections are configured such that, after the respective section is passed through, the final value of the current is lower than the starting value of the current, and after the predefined profile of the current is passed through, the pin is in an end position in which, in the case of a valve which is open in a de-energized state, said pin does not permit the closure of the valve, and in the case of a valve which is closed in a de-energized state, said pin does not permit the opening of the valve.

This has the advantage that, by means of the predefined current profile with the section or the sections with continuously falling current profile and the temporally subsequent continuously rising current profile, the valve can be closed slowly in the case of a valve which is closed in a de-energized state, or can be opened slowly in the case of a valve which is open in a de-energized state, such that the noise generated by the valve can be kept low, and reliable and sufficiently fast closing or opening, respectively, of the valve can nevertheless be achieved. Furthermore, wear of the valve can be kept low. Furthermore, an inexpensive design of the valve is possible.

In one embodiment, the profile of the current in each of the temporally consecutive sections is of V-shaped configuration. This has the advantage that the profile of the current has a simple, easily producible form.

In a further embodiment, the valve is arranged in an injection system of an internal combustion engine, and the profile of the current is determined as a function of characteristic values of the internal combustion engine. This has the advantage that the valve can be respectively closed or opened quietly under the operating conditions of the internal combustion engine.

Figure 1:
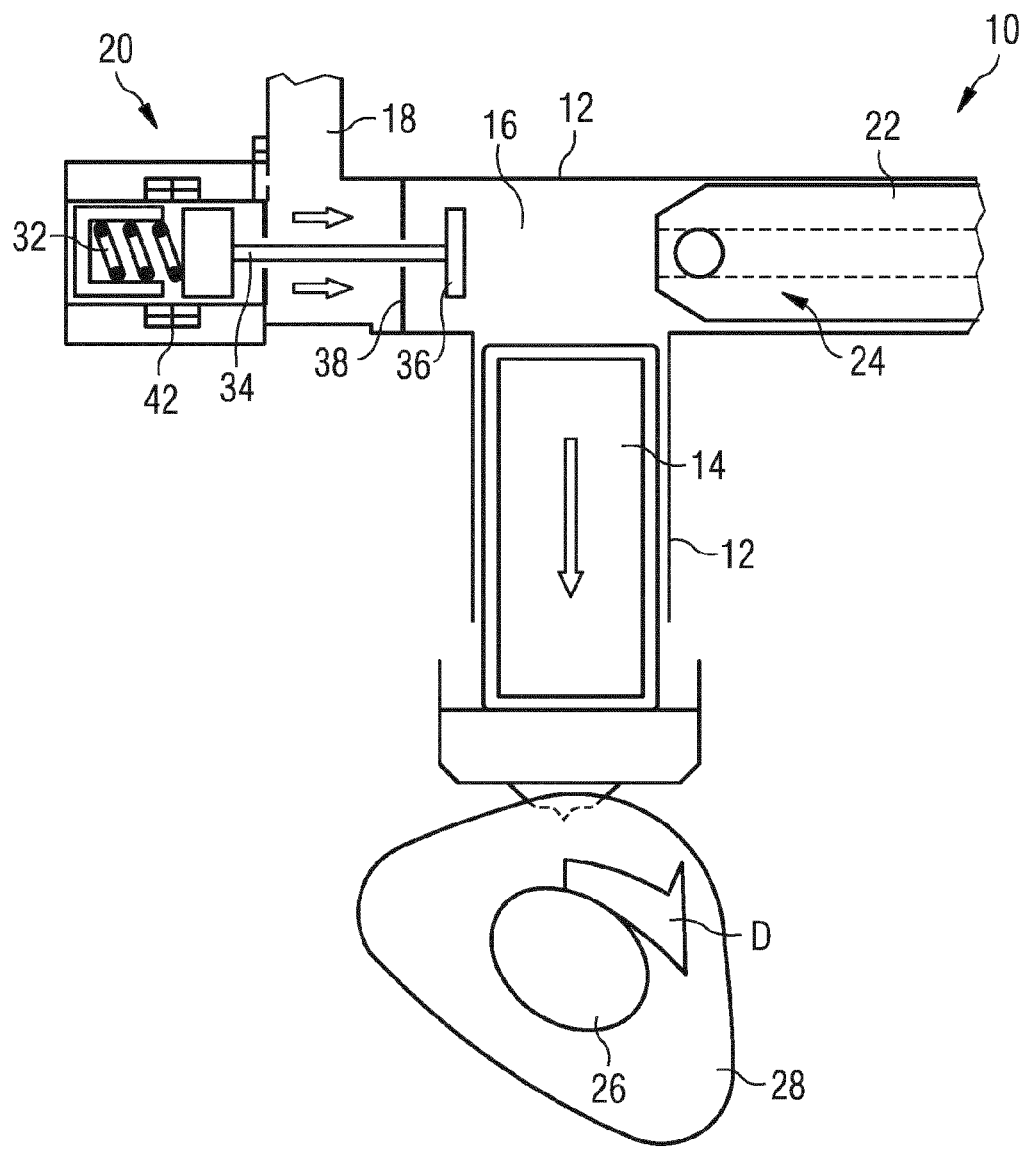
FIG. 1 shows a schematic view of a pump with a valve in a longitudinal section.

FIG. 1 shows a pump 10 having a pump housing 12. The pump 10 is in particular in the form of a high-pressure pump, e.g., a radial piston pump. A pump piston 14 is movably mounted in the pump housing 12. A pump chamber 16 is situated in the pump housing 12 at one end of the pump piston 14. To enable the pressure chamber 16 to be filled with fluid, said pressure chamber has an inflow line 18 in which there may be arranged a valve 20 in the form of an inlet valve, e.g., a digitally switchable inlet valve. The valve 20 facilitates the filling of the pressure chamber 16 and, during the filling process, prevents a return flow of the fluid out of the inflow line 18. The pressure chamber 16 also has an outflow line 22 in which there is arranged a further valve 24 in the form of an outlet valve. Fluid can thereby be discharged from the pressure chamber 16.

The pump 10 also has a drive shaft 26 which is operatively connected to an eccentric ring 28 and which can be rotated clockwise in a direction of rotation D. Instead of the eccentric ring 28, use may also be made of a camshaft. The pump 10 may alternatively also be designed as a crank-drive pump.

Figure 2:
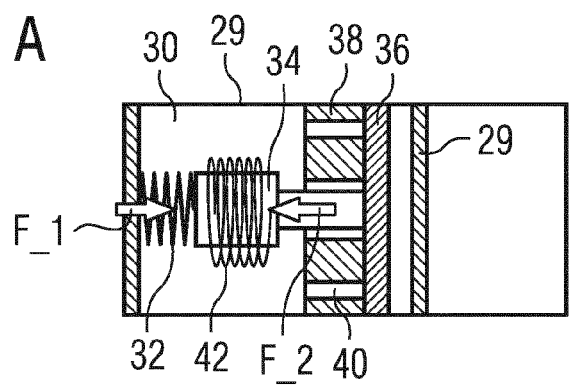
FIG. 2 shows a schematic view of the valve in three operating states.
Figure 2:
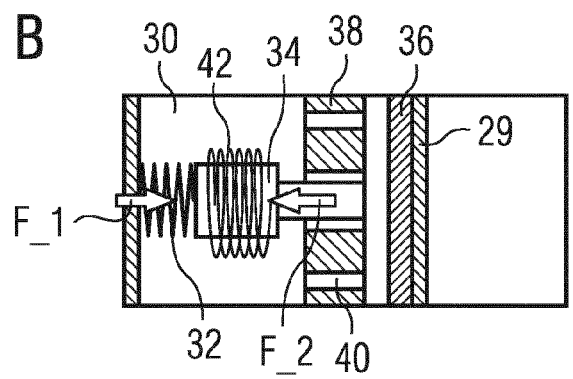
Figure 2:
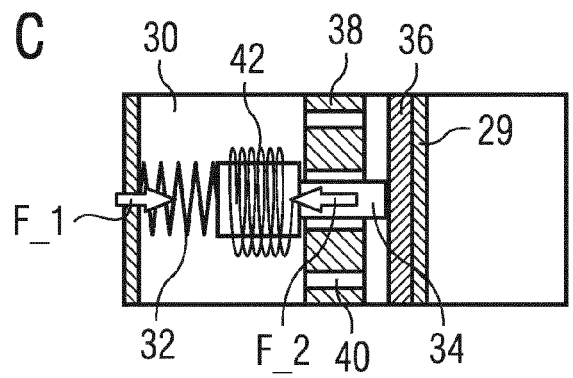

FIG. 2 shows an exemplary embodiment of a valve 20 in three operating states.

The valve 20 has a valve housing 29 which has a recess 30. A spring 32, a pin 34 and a sealing element 36 are arranged in the recess 30. The spring 32, by virtue of its being supported on a wall of the recess 30, preloads the sealing element 36 via the pin 34.

Also situated in the recess 30 is a sealing seat 38 which is arranged fixedly with respect to the valve housing 29 and which has passage recesses 40. Fluid can flow via the passage recesses 40 when the sealing element 36 is not bearing against the sealing seat 38.

The valve 20 also has an actuator 42. The actuator 42 may be a magnet coil. The pin 34 is arranged partially within the actuator 42 and can be actuated by the actuator 42.

The mode of operation of the pump 10 and of the valve 20 will be described below:

By means of a rotational movement of the drive shaft 26 in the direction of rotation D, the pump piston 14 is moved by means of the eccentric ring 28 toward the drive shaft 26 until said pump piston reaches a bottom dead centre UT (see also FIG. 3). Here, the valve 20 opens owing to a spring force $F\_1$ of the spring 32 and the pressure difference upstream and downstream of the valve 20. The sealing element 36 lifts from the sealing seat 38. The pressure chamber 16 is now filled with fluid. By means of a further rotational movement of the drive shaft 26 in the direction of rotation D, the pump piston 14 is moved away from the drive shaft 26 by the eccentric ring 28, and in the process compresses the fluid situated in the pressure chamber 16. At a predefined time, the valve 20 is closed by virtue of a current being applied to the actuator 42, whereby an actuator force $F\_2$, which counteracts the spring force $F\_1$, can act on the pin 34. Owing to the movement of the pin 34 in the direction of the actuator force $F\_2$ and the prevailing pressure conditions upstream and downstream of the valve 20, the sealing element 36 can abut against the sealing seat 38, and a fluid flow through the passage recesses 40 is prevented. The fluid that is compressed in the pressure chamber 16 can now, in its entirety, be discharged out of the pump 10 via the further valve 24 in the form of an outlet valve. The pump piston 14 has now reached a top dead centre OT (see also FIG. 3).

If the pump 10 is a high-pressure fuel pump of an injection system of an internal combustion engine, the highly pressurized fuel may pass to a fluid accumulator in the form of a high-pressure fuel accumulator, the so-called common rail.

Both during the opening and during the closing of the valve 20, mechanically and hydraulically induced noises can be generated at the valve 20. The noises generated during the opening of the valve 20 will be described below on the basis of FIG. 2. During the opening of the valve, in a first step, the sealing element 36 abuts against the valve housing 29 (FIG. 2B), whereby a first noise can be generated. The pin 34 is subsequently moved in the direction of the sealing element 36 by the spring force $F\_1$ of the spring 32. A further noise can be generated if the sealing element 36 and the pin 34 impact against one another (FIG. 2C). If the pin 34 and the sealing element 36 are formed together in one piece, the first noise in particular may be very considerable owing to the joint mass of pin 34 and sealing element 36.

The method for controlling the valve 20 will be presented in detail below for a valve which is open in a de-energized state (FIG. 3). It is self-evident that this may be applied correspondingly to a valve which is closed in a de-energized state. For the explanation of the method, it is the intention only to describe the current profile between top dead centre OT and bottom dead centre UT.

For an opening of the valve 20, a control device is configured to apply a current I with a predefined profile to the actuator 42 (top of FIG. 3). The applied current I decreases proceeding from a starting value $I\_0$. At the starting value $I\_0$ of the current, the actuator force $F\_2$ is greater than the spring force $F\_1$. The pin 34 is thus pushed in the direction of the spring 32, counter to the spring force $F\_1$, and is situated in a starting position $P\_0$ (bottom of FIG. 3). In this state, the valve 20 can be closed (FIG. 2A). If the valve 20 is arranged in the pump 10, the applied current assumes the initial value $I\_0$ when the pump piston 14 reaches top dead centre OT.

During the further course of operation, the control device applies the current to the actuator 42 such that the profile of the current has one section or multiple temporally consecutive sections, wherein, in each of the sections, the current I initially continuously decreases in a first time interval $\Delta t1$ and continuously increases again in a second time interval $\Delta t2$. In the first section, the decrease of the current takes place proceeding from the starting value $I\_0$, at which the actuator force $F\_2$ is greater than the spring force $F\_1$. The continuous decrease of the current in the first time interval $\Delta t1$ takes place until a predefined value of the current is reached. In the further profile, in the second time interval Δt2, the current continuously increases again until it reaches a final value in the section. The final value of the current is lower than the starting value I_0 of the current.

In the cyclically consecutive sections, the decrease of the current takes place proceeding from the previously attained final value of the current until a predefined value of the current is reached, before then continuously increasing again in the further profile until it reaches a new final value. In the cyclically consecutive sections, the new final value of the current is in each case lower than the preceding final value of the current. In the example shown in FIG. 3, the method is illustrated for four cyclically consecutive sections.

In the embodiment illustrated here, the predefined profile of the current in the temporally consecutive sections is of V-shaped configuration. The profile of the current may however also have any other desired form with a continuous decrease and a subsequent continuous increase of the current; for example, the profile of the current may also be U-shaped in one or more of the sections.

As the illustrated current profile is passed through, at a certain value of the current, the actuator force F_2 becomes lower than the spring force F_1, and the pin 34 can move toward the sealing element 36. In the example shown in FIG. 3, the start of the movement of the pin 34 takes place during the second section of the current profile. When the pin 34 has been set in motion, it is possible, by means of the respective increase of the current in the individual sections of the current profile, for a braking force to be exerted on the pin 34. The movement of the pin 34 toward the sealing element 36 is thus braked. In the example illustrated, the braking movement of the pin 34 takes place substantially in the third section of the current profile (see bottom of FIG. 3; for comparison, the profile of the movement of the pin 34 without braking movement is illustrated by dashed lines).

As a result of the braking of the pin 34, the latter can, in an end position P_F, come into contact with the sealing element 36 softly. The position of the sealing element 36 with respect to the sealing seat 38 can thereby be fixed such that the valve 20 can be held open in an effective manner. As a result of the slow movement of the pin 34 toward the sealing element 36, the noise of the valve 20 can be kept very low, and reliable and sufficiently fast opening of the valve 20 is nevertheless possible. As a result of the slow movement of the pin 34, it is furthermore possible for the wear of the valve 20 to be kept low.

If the valve 20 is arranged in the pump 10, the control devices sets the applied current to zero when the pump piston 14 is close to bottom dead centre UT. A delivery of fuel at the start of the delivery phase of the pump 10 can thus be ensured.

What is claimed is:

1. A method for controlling a valve having a spring with a spring force, an actuator with an actuator force that counteracts the spring force, and a pin coupled to the spring and which can be actuated by the actuator, the method comprising:
    applying to the actuator a current having a predefined profile proceeding from a starting value of the current, at which the pin is in a starting position in which the pin allows movement of a de-energized valve between open and closed positions,
    wherein the predefined current profile includes at least one section, each section defining:
    a starting current value,
    a final current value that is lower than the starting current value,
    a first time interval with a continuously falling current profile, and
    a subsequent second time interval with a continuously rising current profile, and
    wherein after the predefined profile of the current is passed through, the pin is in an end position in which the pin prevents movement of the de-energized valve between the open and closed positions.

2. The method of claim 1, wherein each section of the predefined current profile defines a V-shaped profile.

3. The method of claim 1, wherein the valve is arranged in an injection system of an internal combustion engine, and wherein the profile of the current is defined as a function of characteristic values of the internal combustion engine.

4. The method of claim 1, wherein each section of the predefined current profile defines a U-shaped profile.

5. The method of claim 1, wherein the predefined current profile includes multiple successive sections.

6. The method of claim 5, wherein for each section after the first section, the starting current value is lower than the starting current value of the preceding section.

7. The method of claim 5, wherein for each section after the first section, the final current value is lower than the final current value of the preceding section.

8. The method of claim 7, wherein for each section after the first section, the final current value is lower than a minimum current value of the preceding section.

9. An control device for controlling a valve having a spring with a spring force, an actuator with an actuator force that counteracts the spring force, and a pin coupled to the spring and which can be actuated by the actuator,
    wherein the control device is configured to apply to the actuator a current having a predefined profile proceeding from a starting value of the current, at which the pin is in a starting position in which the pin allows movement of a de-energized valve between open and closed positions,
    wherein the predefined current profile includes at least one section, each section defining:
    a starting current value,
    a final current value that is lower than the starting current value,
    a first time interval with a continuously falling current profile, and
    a subsequent second time interval with a continuously rising current profile, and
    wherein after the predefined profile of the current is passed through, the pin is in an end position in which the pin prevents movement of the de-energized valve between the open and closed positions.

10. The control device of claim 9, wherein each section of the predefined current profile defines a V-shaped profile.

11. The control device of claim 9, wherein the valve is arranged in an injection system of an internal combustion engine, and wherein the profile of the current is defined as a function of characteristic values of the internal combustion engine.

12. The control device of claim 9, wherein each section of the predefined current profile defines a U-shaped profile.

13. The control device of claim 9, wherein the predefined current profile includes multiple successive sections.

14. The control device of claim 13, wherein for each section after the first section, the starting current value is lower than the starting current value of the preceding section.

15. The control device of claim 13, wherein for each section after the first section, the final current value is lower than the final current value of the preceding section.

16. The control device of claim 15, wherein for each section after the first section, the final current value is lower than a minimum current value of the preceding section.

17. A valve system, comprising:
a valve having a spring with a spring force, an actuator with an actuator force that counteracts the spring force, and a pin coupled to the spring and which can be actuated by the actuator, and
a valve control device configured to apply to the actuator a current having a predefined profile proceeding from a starting value of the current, at which the pin is in a starting position in which the pin allows movement of a de-energized valve between open and closed positions,
wherein the predefined current profile includes at least one section, each section defining:
a starting current value,
a final current value that is lower than the starting current value,
a first time interval with a continuously falling current profile, and
a subsequent second time interval with a continuously rising current profile, and
wherein after the predefined profile of the current is passed through, the pin is in an end position in which the pin prevents movement of the de-energized valve between the open and closed positions.

* * * * *